United States Patent [19]

Adell

[11] Patent Number: 4,499,689

[45] Date of Patent: Feb. 19, 1985

[54] DOOR EDGE GUARD

[75] Inventor: Robert Adell, Sunnyvale, Tex.

[73] Assignee: U.S. Product Development Company, Sunnyvale, Tex.

[21] Appl. No.: 533,690

[22] Filed: Sep. 19, 1983

[51] Int. Cl.³ .............................................. E05F 7/00
[52] U.S. Cl. ....................................... 49/462; 52/716
[58] Field of Search .............. 49/462, 491, 440, 441; 52/716–718; 428/31, 122, 358

[56] References Cited

U.S. PATENT DOCUMENTS

| | | | |
|---|---|---|---|
| 2,746,103 | 5/1956 | Bright | 49/491 |
| 4,334,700 | 6/1982 | Adell | 49/462 X |
| 4,338,148 | 7/1982 | Adell | 49/462 X |
| 4,372,083 | 2/1983 | Hatzikelis et al. | 49/462 |

OTHER PUBLICATIONS

"Metals Handbook", 8th Edition, vol. 1, pp. 888 and 943.

*Primary Examiner*—Philip C. Kannan
*Attorney, Agent, or Firm*—Stephenson and Boller

[57] ABSTRACT

An edge guard comprises a generally U-shaped cross section with insulated beads formed at the outer marginal edges of the legs which apply the retention force to the door edge. The invention provides a construction which is self-retaining on different types of surfaces. The metallic material of the edge guard is 5052 H-23 aluminum.

3 Claims, 2 Drawing Figures

DOOR EDGE GUARD

BACKGROUND AND SUMMARY OF THE INVENTION

This invention relates to an edge guard of the type applied to the trailing edges of automobile doors.

The advantages of door edge guards are recognized by the automobile industry. Edge guards provide functional, decorative and protective aspects when applied to the trailing edges of automobile doors or the edges of other swinging closures.

The original equipment automobile industry has never approved of strictly plastic edge guards but rather has insisted upon metal edge guards because of their superior characteristics. In order however to provide certain styling features, it has been deemed desirable to provide other than a metallic appearance to the exposed exterior of an installed door edge guard.

Many of applicant's inventions, as evidenced by the following patents, relate to insulated door edge guards: U.S. Pat. Nos. 4,259,812, 4,338,148, 4,379,376, 4,316,348, 4,365,450, 4,379,377, 4,334,700, 4,377,056, 4,387,125.

Applicant also has pending applications directed to the same general subject.

One procedure for making an insulated door edge guard comprises laminating a sheet of plastic to a sheet of metal, then slitting the laminated sheets into desired widths and roll-forming the strips into desired U-shaped cross section. One part of the procedure involves the formation of beads on the ends of the legs. In an insulated metal edge guard where the exterior of the edge guard is covered by insulation, the inward turning of the beads will result in insulation being disposed between the metal of the edge guard and the door edge at the points of force application when the edge guard is mounted on the door.

The usage of self-retaining edge guards is deemed desirable but depending upon painting procedures which are used on automobiles the insulated metal edge guards may not exhibit the expected self-retention characteristics on a door edge.

The present invention relates to an edge guard which provides a solution to the inability of an edge guard to exhibit the expected self-retention characteristics on particular types of painted surfaces. The invention arises through the judicious selection of material for the metal edge guard so that a desired retention characteristic is obtained for different types of paint procedures on door edges.

By way of example reference is made to a water based paint procedure and a solvent based paint procedure. For a given door, the differences in these two procedures may result in a situation where an edge guard is self-retaining on one type of painted surface but exhibits less than expected self-retention characteristics on the other type of painted surface.

The invention will be described in detail with reference to the accompanying drawings, the ensuing description, and the appended claims. The disclosure is of a preferred embodiment according to the best mode contemplated at the present time in carrying out the invention.

DESCRIPTION OF THE PREFERRED EMBODIMENT

Figure 1:
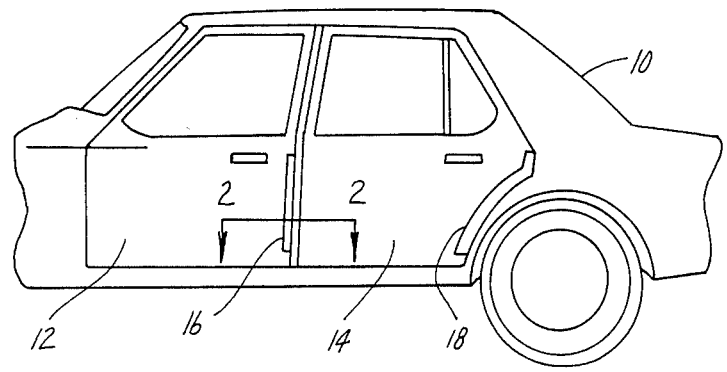
FIG. 1 is a partial side elevational view of an automobile containing door edge guards embodying principles of the present invention.

FIG. 1 shows an automobile 10 having front and rear doors 12 and 14 containing door edge guards embodying principles of the present invention. The door edge guards are identified by the reference numerals 16, 18 and by way of example are shown to be fully coextensive in length with the trailing edges of the respective doors to which they are applied. However, the door edge guards need not necessarily be of the same length as the trailing edges of the doors and therefore the drawing illustration of FIG. 1 should be considered to be merely representative.

Figure 2:
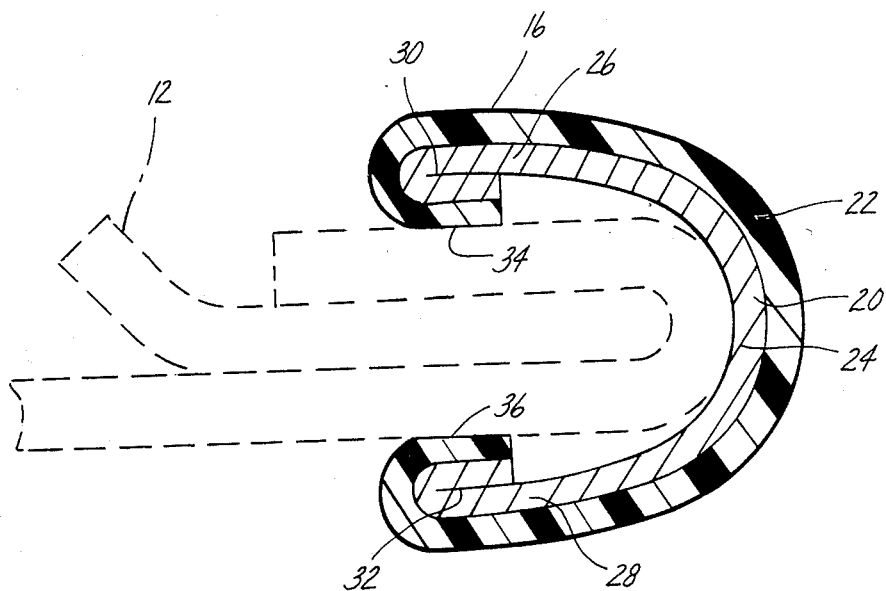
FIG. 2 is a cross sectional view taken in the direction of arrows 2—2 in FIG. 1 and enlarged.

FIG. 2 illustrates the edge guard cross section which is representative throughout the length of the edge guard. The edge guard comprises an insulated metal structure comprising a metal edge guard member 20 and an insulating liner 22. The edge guard metal channel has a generally semi-circular base 24 with legs 26 and 28 extending away from the generally semi-circular base. The distal ends of the legs are provided with beads 30 and 32 formed by fully reverse turning the distal ends of the legs back onto themselves in the inward direction. The insulating liner 22 covers the exterior of the U-shaped cross section and extends around the rounded ends of the beads so that the beads are covered with insulation at the points 34, 36 where the self-retention pressure is applied by the metal edge guard channel to opposite sides of the door. Hence at the points of retention force application, the metal of channel 20 is insulated from the door edge.

One procedure for fabricating the edge guard comprises laminating a flat sheet of plastic to one surface of a metal strip and then slitting the strip to an appropriate width. The laminated strip is then formed to the illustrated cross section through roll-forming procedures. This yields the finished edge guard construction in which the plastic laminate lines the exterior of the edge guard so as to provide a desired outward appearance when the edge guard is installed on the door edge. Yet at the same time, the formation of the inwardly directed beads results in insulation being disposed between the metal channel and the door edge at the points of force application. Moreover, where the insulation is a grained plastic film, it is preferred to orient the grain such that the length of the grain runs lengthwise of the edge guard. This will result in the forces exerted on the beads during installation of the edge guard on the door being across the grain, rather than with the grain, and this reduces the tendency to tear the film from the metal.

Because it is the intention to have the edge guard self-retaining on the door edge without the use of separate adhesives or other procedures, the metal channel must bear certain characteristics. Heretofore, stainless steel has been one of the preferred materials for exerting suitable self-retention force for the installed edge guard yet one which can be subjected to the required fabrication and installation procedures. However, because the metal exterior is covered by insulation, it is more economical to use a less expensive material such as aluminum.

As explained earlier in this application, it was found that on certain doors, edge guards would not exhibit the desired self-retention characteristics while on certain other doors there was no departure from the desired self-retention characteristics. The source of this problem was traced to different types of painting procedures applied by different plants to the same model of door. These two procedures are a solvent-based procedure and a water-based procedure. On one type of paint, the edge guards were satisfactorily self-retained while on the other, less than desired retention force had a tendency to occur, resulting in loosening of the edge guards or inability to be installed and retained on the door edge. Efforts to dimensionally redesign the edge guard in order to obtain a construction which exhibited satisfactory characteristics for both types of painted doors proved unsuccessful. However, further diligent research and investigation resulted in the selection of a new material for the metal edge guard channel which was able to solve the problem. The material involved and which is now used in the manufacture of the edge guards is 5052 H-33 aluminum. This material exhibits particular hardness and temper characteristics which enable edge guards so constructed to be installed and satisfactorily retained on both types of painted doors, yet enabling the laminated material to be formed to the desired cross sectional shape to achieve the desired appearance characteristics with the economy of aluminum rather than stainless steel.

While a preferred embodiment of the invention has been disclosed, it will be appreciated that principles are applicable to other embodiments.

What is claimed is:

1. A self-retaining insulated metal edge guard comprising a metallic channel having a U-shaped cross section, a non-metallic covering extending around the exterior of the U-shaped cross section, inwardly turned beads at the ends of the U-shaped cross section, said covering extending around said beads so as to cover the inwardly facing surfaces of said beads, and in which the material of said metal is 5052 H-33 aluminum, said metallic channel adapted to apply the self-retention force via said beads through said covering on the inwardly facing surfaces of said beads.

2. An edge guard as set forth in claim 1 in which said beads are disposed directly opposite one another.

3. In a self-retaining insulated metal U-shaped edge guard wherein the self-retention forces are applied to opposite sides of an edge through a plastic insulating material such as vinyl when the edge guard is installed on an edge, the improvement which comprises the metal of the edge guard consisting of 5052 H-33 aluminum.

* * * * *